(12) United States Patent
Oyama et al.

(10) Patent No.: US 6,380,832 B2
(45) Date of Patent: Apr. 30, 2002

(54) ELECTROMAGNETIC ACTUATOR

(75) Inventors: Hitoshi Oyama; Takao Nishioka; Kenji Matsunuma; Takatoshi Takikawa, all of Itami (JP)

(73) Assignee: Itami Works of Sumitomo Electric Industries, Ltd., Kyogo (JP)

( * ) Notice: Subject to any disclaimer, the term of this patent is extended or adjusted under 35 U.S.C. 154(b) by 0 days.

(21) Appl. No.: 09/731,817

(22) Filed: Dec. 8, 2000

(30) Foreign Application Priority Data

Dec. 9, 1999 (JP) .............................................. 11-349868
Nov. 16, 2000 (JP) .............................................. 12-350055

(51) Int. Cl.⁷ .............................. H01F 3/00; H01F 7/08

(52) U.S. Cl. ........................ 335/281; 336/233; 335/256; 251/129.15

(58) Field of Search ........................ 335/251, 255–260, 335/261, 266–270, 281; 251/129.01, 129.95; 336/233

(56) References Cited

U.S. PATENT DOCUMENTS

| 4,299,252 A | * 11/1981 | Reinicke ...................... 335/229 |
| 6,118,366 A | * 9/2000 | Bulgatz et al. ............. 336/234 |
| 6,198,370 B1 | * 3/2001 | Schmitz ....................... 335/256 |

FOREIGN PATENT DOCUMENTS

| JP | 58-52810 | * 3/1983 |
| JP | 1-121561 | * 5/1989 |
| JP | 11-93629 | 4/1999 |

* cited by examiner

*Primary Examiner*—Lincoln Donovan
*Assistant Examiner*—Tuyen T. Nguyen
(74) *Attorney, Agent, or Firm*—McDermott, Will & Emery (57) ABSTRACT

An electromagnetic actuator for an automotive internal combustion engine is provided which has a stator, the weight of which is reduced. The electromagnetic actuator has a pair of electromagnets each made up of a stator and a coil, an armature disposed between the pair of electromagnets so as to be reciprocable therebetween, and a first stem provided on one side of the armature for transmitting the movement of the armature to external. The stator is formed by powder molding.

5 Claims, 4 Drawing Sheets

ELECTROMAGNETIC ACTUATOR

BACKGROUND OF THE INVENTION

The present invention relates to an electromagnetic actuator used mainly in an automotive internal combustion engine.

A conventional electromagnetic actuator for automotive internal combustion engines is made up of a large number of parts as disclosed e.g. in Japanese patent publication No. 11-93629. For these parts, there is no disclosure about their material and attempts for lessening their weights.

Because the electromagnetic actuator disclosed in the abovesaid publication is provided for each valve, its weight directly influences the total weight of an internal engine. When it is used in an automobile, its weight influences the fuel consumption and the engine performance. Thus reduction in weight of the electromagnetic actuator is a large problem.

Since the size and weight of the parts are proportional to the electromagnetic force required to the electromagnetic actuator, parts in the magnetic circuit are needed which generate electromagnetic force efficiently, to achieve reduction in weight of the electromagnetic actuators. But conventional magnetic circuit parts using silicon steel plates had low saturated magnetic flux density and production of eddy current decreased response of the actuator. Thus increase in the size and weight of the magnetic circuit and the actuator was inevitable for greater performance flexibility.

An object of the present invention is to improve the electromagnetic performance of a stator as one of magnetic circuit parts forming an electromagnetic actuator used in an automotive internal combustion engine, thereby reducing the size and weight of an electromagnetic actuator.

SUMMARY OF THE INVENTION

According to this invention, there is provided an electromagnetic actuator comprising a pair of electromagnets each made up of a stator and a coil, an armature disposed between the pair of electromagnets so as to be reciprocable therebetween, and a first stem provided on one side of the armature for transmitting the movement of the armature to external, the stator being formed by powder molding.

The use of a metal powder molded body as a stator improves the electromagnetic properties of the stator and makes it possible to obtain a more compact, light-weight electromagnetic actuator.

DETAILED DESCRIPTION OF THE PREFERRED EMBODIMENT

Figure 1:
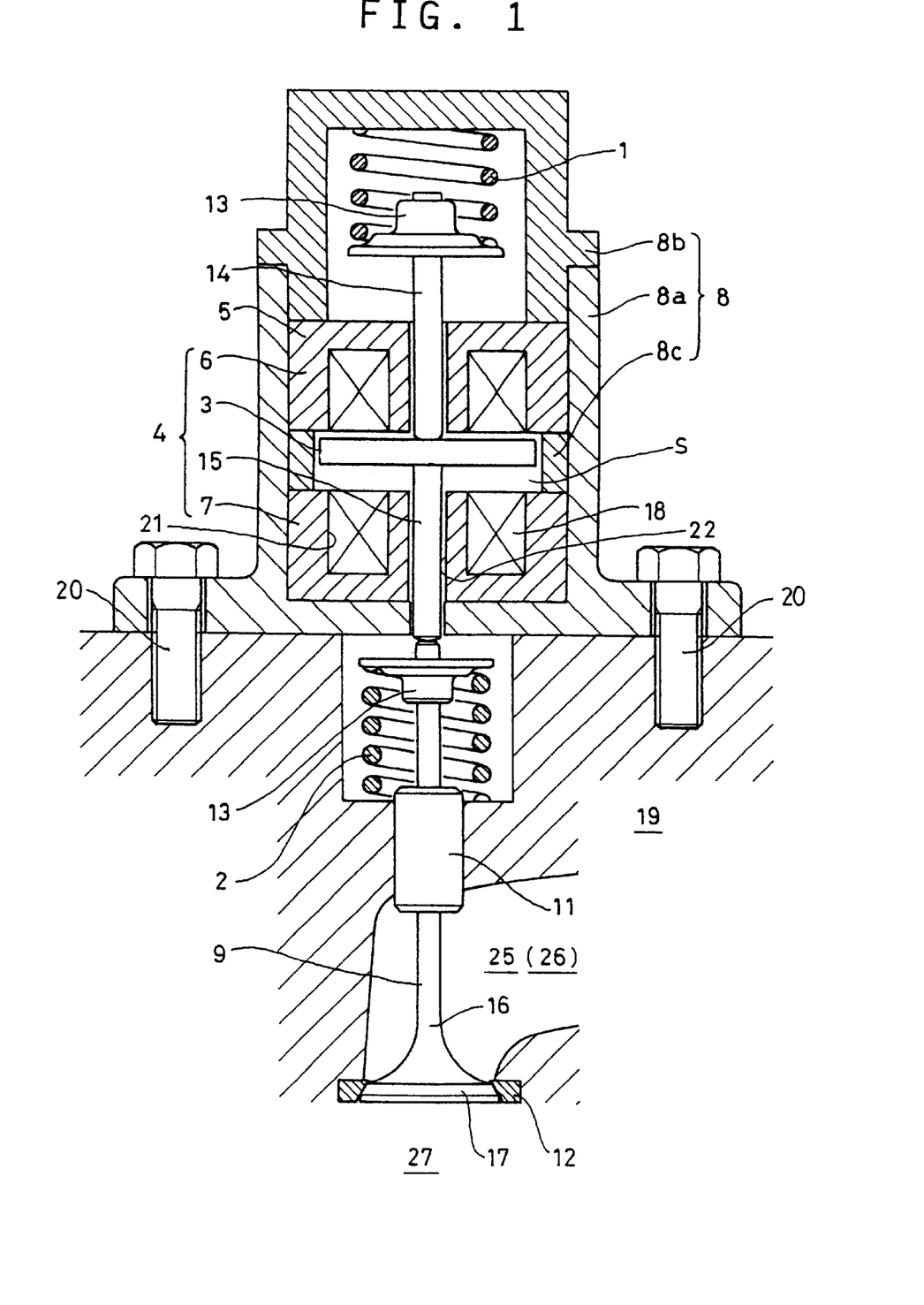
FIG. 1 is a sectional view of a valve open-close mechanism embodying the present invention.

The electromagnetic actuator 4 for an internal combustion engine according to this invention has, as shown in FIG. 1, a pair of electromagnets 6, 7, an armature 3, and a movable element comprising a first stem 15 for transmitting a force acting on the armature 3 to external.

The armature 3 is mainly made from a magnetic material. The electromagnets 6, 7 are each made up of a stator 5 and a coil 18. By passing a current through the coils 18, a magnetic field is produced. The pair of electromagnets 6, 7 are provided opposite to each other with a gap S therebetween. The armature 3 is disposed in this gap S. Thus, the armature 3 is reciprocable between the two electromagnets 6, 7 by the magnetic field produced by the electromagnets. If the armature is joined or mechanically fastened to the first stem 15 or the second stem 14, the armature 3 is smoothly reciprocated between two electromagnets, by the first stem 15 or the second stem 14. If an inter-electromagnet housing 8c is provided very close to the outer peripheral surface of the armature 3, using the housing 8c as a guide, the armature 3 can be smoothly reciprocated between two electromagnets 6, 7.

In order to transmit the movement of the armature 3 from one electromagnet 6 toward the other electromagnet 7, the first stem 15 is inserted in a guide hole 22 provided in the stator 5 of the electromagnet 7. By the first stem 15, the movement of the armature 3 from the electromagnet 6 toward the electromagnet 7 acts on the valve 9, which is in abutment with the tip of first stem 15, thereby opening the valve of the internal combustion engine.

The stators 5 may be manufactured by machining an iron-base material, but may be manufactured by molding an iron-base powder by powder molding. Specifically they may be manufactured by molding the powder by cold die press molding, warm die press molding or injection molding.

Figure 5A:
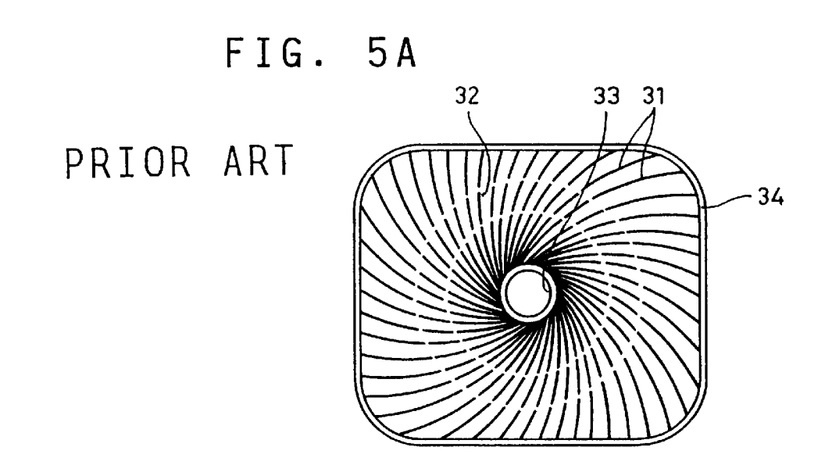
FIG. 5A is a plan view of a conventional stator.
Figure 5B:
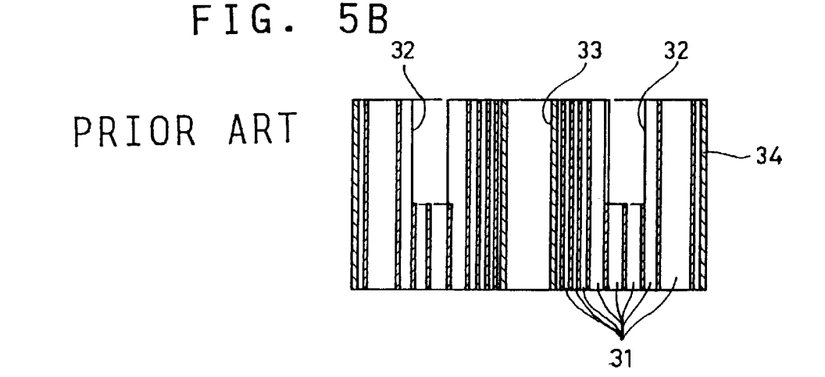
FIG. 5B is a sectional front view of the same.

In contrast, with a conventional electromagnet, as shown in FIG. 5, since a coil is wound around a stator 34 formed with a recess 32 for housing an electromagnetic steel plate 31 or a guide hole 33 formed by machining, it is large in volume as an electromagnet, and machining such as cutting is necessary.

Figure 4A:
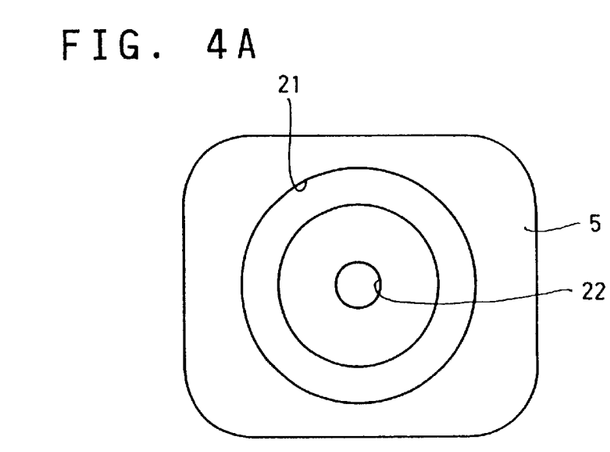
FIG. 4A is a plan view of a stator embodying this invention.
Figure 4B:
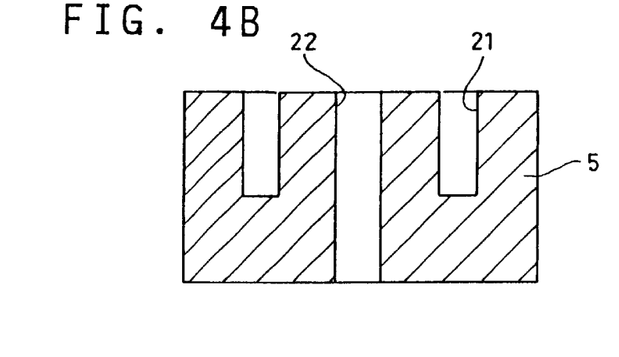
FIG. 4B is a sectional front view of the same.

Thus, by employing by powder molding, as shown in FIG. 4, the recess 21 and the guide hole 22 can be formed with good accuracy, so that machining after molding can be omitted. The stator can be designed more compact than a conventional one. Also, since it is possible to mount a pre-made coil in the recess 21, the number of manufacturing steps is fewer and mass-productivity is high.

In order to obtain a flux density equal to or higher than with conventional electromagnets using laminated steel plates and to increase workability, it is necessary to increase the density of the green compact. In order to increase the density of the green compact and to mold more compact stators 5, warm pressing or injection molding is advantageous.

In the abovesaid powder molding method, molten iron is rapidly cooled and solidified into powder by blowing water under high pressure against it and the powder is dried and passed through a mesh of a predetermined size for adjustment of powder particle diameter. The powder thus prepared is molded in an ordinary manner for densification and imparting shape into parts.

The iron-base powder used for powder molding may be an ordinary iron-base powder, but an iron-base powder having an iron oxide film or a resin coated film is preferable. If powder molding is carried out using such an iron-base powder, as a constituent component of stators obtained, part or whole of the iron oxide film or coated resin film remains. Thus, formation of eddy current, which tends to be produced in a solid metal, is suppressed, so that stators 5 with low iron loss are obtained. The stator can be designed more compact than a conventional one. The iron oxide film is a film formed by oxidizing the surface of an iron-base powder. The resin coated film is a film formed on the surface of an iron-base powder by applying, immersing or depositing a thermoplastic or thermosetting resin.

The density of the stator 5 obtained is preferably 7.0 to 9.0 g/cm$^3$, and more preferably 7.4 to 7.8 g/cm$^3$. If it is less than 7.0 g/cm$^3$, sufficient magnetic properties cannot be expected, and chipping tends to occur during machining. If it is more than 9.0 g/cm$^3$, the magnetic properties may decrease markedly due to the mixing of impurities.

Thus, with the electromagnets using such stators, due to the effect of reduction in volume, reduction in volume of the constituent parts including the below-described housing is achieved, so that it is possible to reduce their weights.

Heretofore, when the stems were passed through the guide holes 33 of the stators 34, it was necessary to mount slide bearings. In contrast, if the above stators are used, since surface smoothness and dimensional accuracy of the molded members are assured, no slide bearings are necessary, so that it is possible to insert the first stem 15 and the second stem 14 into the guide holes 22, 22'. This leads to reduction of the number of parts, which in turn results in reduction in weight and improved mass-productivity.

The coils 18 may be formed from a copper-base material. But it is preferable to form them from aluminum or a material containing aluminum as its major component. With this arrangement, a reduction of weight of the coils 18 is achieved. For the coils 18, a 1000-series or 6000-series aluminum alloy specified in JIS H 4000 may be used. Because heat resistance of 180° C. or over is required, a coating material of the coils 18 may be an esterimide, a polyimide or a polyamide-imide.

Figure 2A:
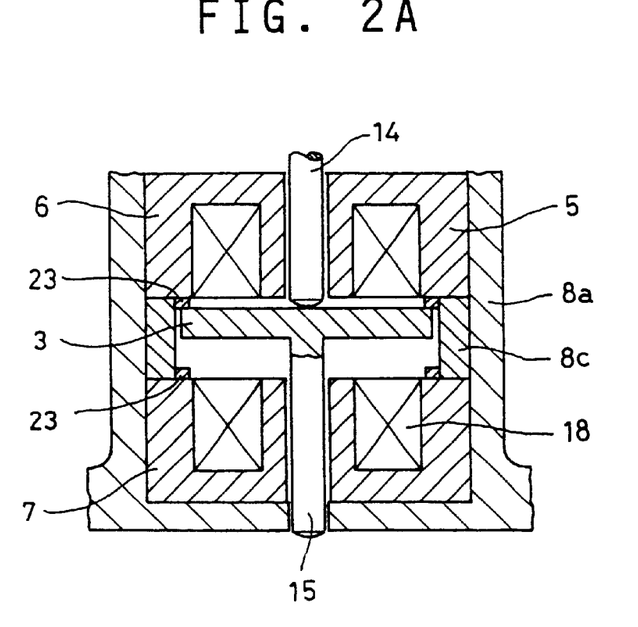
FIGS. 2A, 2B are enlarged sectional view of a portion of other embodiments.
Figure 2B:
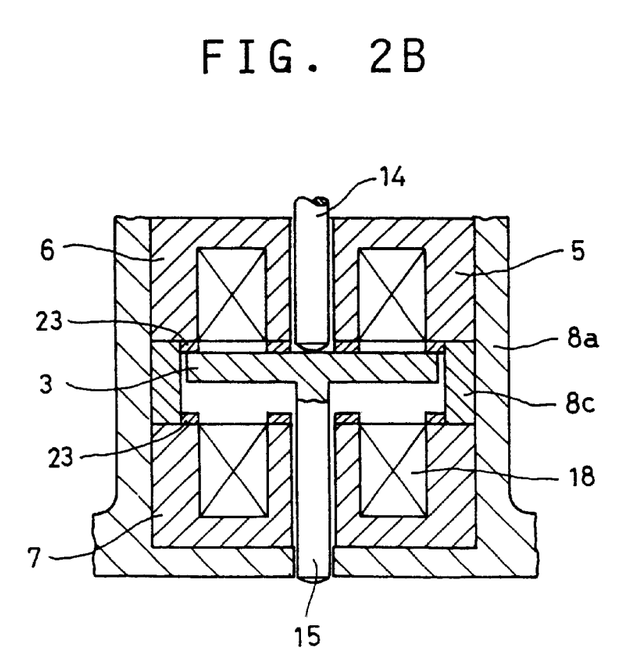

During operation of the electromagnetic actuator, if the armature 3 and the stator 5 contact directly each other, the stator is liable to wear or chipping. Thus, it is preferable to reciprocate the armature 3 so as not to directly contact the stator 5. For this purpose, the reciprocating motion of the armature 3 may be controlled by an electric circuit, or stoppers 23 in the form of an iron plate may be provided on the surface of the stator 5 to prevent a direct contact with the armature 3 as shown in FIGS. 2A, 2B. The use of the stoppers 23 preferably in the form of an iron plate prevents wear or chipping of the stator 5.

Next, the valve-open-close mechanism for an internal combustion engine according to this invention comprises an electromagnetic actuator 4, a housing 8, a valve 9 and a second stem 14.

The electromagnetic actuator 4 is housed in a housing 8, which is fixed to an internal combustion engine body 19 by fixing members 20.

The housing 8 comprises, as shown in FIG. 1, a housing 8a covering the outer peripheral surfaces of the electromagnets 6 and 7, a housing 8b covering the top ends of the electromagnets 6, 7, and an inter-electromagnet housing 8c for keeping the gap between the two electromagnets 6, 7. But as the housing, it is not limited to a structure formed of these three members but may be formed of any desired members according to the assembling conditions of the valve-open-close mechanism for an internal combustion engine according to this invention.

The material forming the housing 8 may be an iron-base material, but an impregnated composite material in which a metallic material has been impregnated into an aggregate comprising a metallic porous member is preferable. By using such a material, a housing high in strength is obtained. Also, reduction in the wall thickness of the housing and making it compact are possible. Thus, it is possible to lessen the weight.

The metallic porous member may be manufactured by subjecting a foamed resin to a conductive treatment with graphite or the like, electroplating it, and subjecting it to heat treatment to remove the foamed resin, or by impregnating a foamed resin with metal/resin slurry, drying and subjecting it to heat treatment to remove the foamed resin.

As the metallic porous member, a high-strength alloy material containing Fe, Cr, Ni, etc. is preferable. Its volume rate is, though it depends on the required strength and weight, preferably within the range of 3-20%.

As the metallic material to be impregnated into the aggregate comprising the metallic porous member, one or two or more selected from a material containing aluminum as its major component such as an aluminum metal, an aluminum alloy or the like, a material whose major component is a magnesium such as a magnesium metal or a magnesium alloy or the like, and foamed aluminum may be used.

As a method of impregnating an aggregate comprising a metallic porous member with a metallic material, a die-cast method, a high-pressure forging method such as molten metal forging, or an impregnation-forging method at a low pressure of several MPa or under can be used. This is because the cell hole diameter of the metallic porous member is of a relatively large size of 0.1 mm to 1 mm and it has an open-cell structure in which all cells communicate with one another.

The foamed aluminum is a foamed-state aluminum or aluminum alloy obtained by melting aluminum or an aluminum alloy such as an aluminum-calcium alloy, and adding a foaming agent such as titanium hydride or zirconium hydride to it to cause foaming by decomposition of the foaming agent.

With the thus obtained impregnated composite material, if an aluminum-base material or a magnesium-base material is used as the metallic material, it is possible to reduce the weight as a whole and thus the weight of the housing 8 itself.

As the fixing members 20, bolts are usually used as shown in FIG. 1. As the material for the fixing members 20, an iron-base material can be used. But it is preferable to use a material whose major component is an aluminum such as aluminum metal or an aluminum alloy.

By using a material whose major component is aluminum as the fixing members 20, reduction in the weight is achieved. Also this is preferable because the internal combustion engine body 19 for mounting the housing 8, such as an engine head, is made from an aluminum-base material, so that it is possible to suppress stress due to a difference in the thermal expansion coefficient when a change in temperature occurs during assembling or operation. As specific examples of the material forming the fixing members 20, materials specified under JIS H 4000 are preferable. In view of tensile strength, 4000-, 5000-, 6000- and 7000-series materials (under JIS H 4000) are preferable.

For the internal combustion engine body 19, a valve 9 for communicating an intake port 25 and an exhaust port 26 with a combustion chamber 27 and shutting them off is provided.

Figure 3:
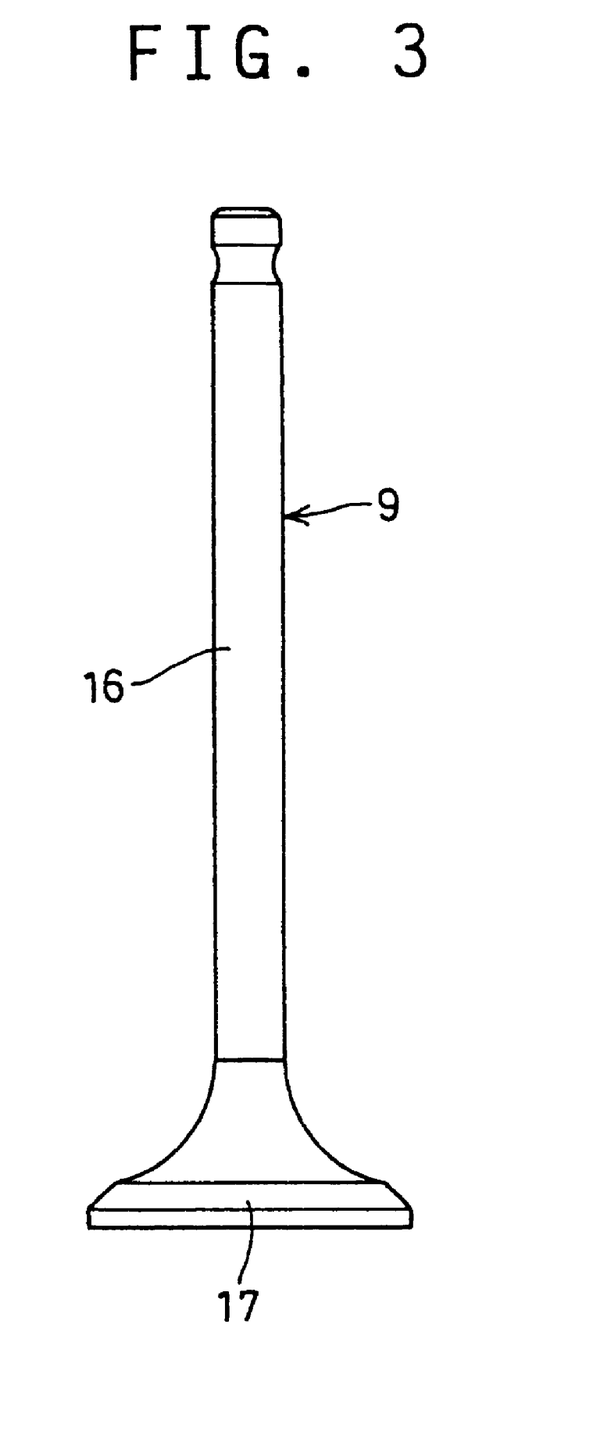
FIG. 3 is a front view showing an example of a valve.

The valve 9 includes a marginal portion 17 forming a valve head and a stem portion 16 forming a shaft. The material for the valve 9 may be an iron-base material but may be such a material that the marginal portion 17 has heat resistance. As shown in FIG. 1, the stem portion 16 and the marginal portion 17 may be made of the same material. For example, a ceramic material whose major component is silicon nitride or SIALON may be used for both the stem portion 16 and marginal portion 17.

Also, they may be made of different materials. For example, the marginal portion 17 may be made of heat-resistant steel alloy and the stem portion 16 may be made of an aluminum alloy sintered body (hereinafter referred to as "aluminum alloy hardened material") formed by molding aluminum alloy powder by the abovementioned powder molding method and then sintering. By using these materials, it is possible to maintain heat resistance of the marginal portion 17 forming the valve and contribute to the reduction in weight.

As the heat-resistant steel alloy, JIS SUH3 (Fe-11 wt %, Cr-2 wt %, Si-1 wt %, Mo-0.6 wt %, Mn-0.4 wt %, C) or the like can be cited as an example.

As for a ceramics containing silicon nitride or SIALON, to ensure reliability against breakage, use of a sintered member containing 80 wt % or more of silicon nitride or SIALON and having a relative density of 95 wt % or over is preferable.

The ceramics include fiber-reinforced ceramics and whisker-reinforced ceramics.

Since the aluminum alloy hardened material has heat resistance in a sliding condition, it is preferable that it has an alloy structure in which in fine aluminum-based crystal particles, a similarly fine intermetallic compound deposits to strengthen the heat resistance and also it is a dense material. As such an example, Al-17 wt %, Si-1.5 wt %, Zr-1.5%, Ni-2%, Fe-5%, Mm can be cited. Here, "Mm" is misch metal, namely, a composite metal formed mainly of rare earth elements such as lanthanum, cerium. By blowing high-pressure gas against alloy molten metal having such a composition, quenched solidified powder is formed. This is compressed, heated at about 500° C., and hot-forged to impart shapes for densification and at the same time to make it into a part. The thus obtained aluminum alloy hardened material having a predetermined shape is formed of fine aluminum-based crystal particles of about 100–1000 nm and strengthened by fine deposition of hard composite intermetallic compound of aluminum and other element metals on the base. The degree of densification is preferably 95% or over.

If such an aluminum alloy hardened material is used as the stem portion 16 and a heat-resistant steel alloy is used as the marginal portion 17, they can be joined together by hot pressing.

By making the stem portion 16 and the marginal portion 17 from different materials and joining them together, it is possible to form most part of the valve from an aluminum alloy and thus lessen the weight, and to selectively strengthen the portion that will be exposed to burning and heated to high temperature.

Also, for the aluminum alloy hardened material and titanium alloy material, in order to improve wear resistance of the sliding surface on the surface of the stem portion 16, the below-described ceramic coating film or carbon-base coating film, or an oxide film may be provided.

The valve 9 is provided such that by moving the armature 3 from the electromagnet 6 toward the electromagnet 7, the tip of the first stem 15 of the electromagnetic actuator 4 abuts the tip of the stem portion 16 of the valve 9 so that the valve opens.

In order to impart a biasing force for valve-closing operation to the valve 9, a retainer 13 is provided on the stem portion 16 of the valve 9 and a first return spring 2 is mounted between the retainer 13 and the internal combustion engine body 19.

Further, a valve guide 11 for guiding the valve-opening and closing motion is provided on the internal combustion engine body 19.

Specifically, the marginal portion 17 of the valve 9 is provided at the boundary between the intake port 25 or exhaust port 26 and the combustion chamber 27, and at the boundary, a valve seat 12 is mounted. The valve 9 is closed by the first return spring 2 and the intake port 25 and exhaust port 26 are shut off from the combustion chamber 27. When the first stem 15 pushes the stem portion 16 of the valve 9 by the movement of the armature 3, the marginal portion 17 is pushed into the combustion chamber 27, so that the intake port 25 or exhaust port 26 and the combustion chamber 27 communicate with each other. Thereafter, by the biasing force imparted by the first return spring 2, the marginal portion 17 is again pressed against the valve seat 12, so that this line is shut off. Here, the valve seat 12 is a member for seating the marginal portion 17. This prevents the marginal portion 17 from directly colliding against the internal combustion engine body 19.

Also, the first return spring 2 is housed in a recess formed in the internal combustion engine body 19, and the valve guide 11 is provided so as to guide the stem portion 16 of the valve 9, which extends through the portion between the recess and the intake port 25 or exhaust port 26.

As for the material forming the retainers 13, 13', it may be an iron-base material. But for the purpose of reducing the inertia weight for improving the quick open-close properties of the valve 9 and reducing the total weight of the internal combustion engine, the abovementioned aluminum alloy hardened material is preferable. This is because high fatigue characteristics are required because they are subjected to repeated stresses from the compression springs. Thus it is necessary to adopt an alloy design in which fine crystal particles on a submicron order are formed and a rapidly solidifying process. By using this, it is possible to lessen the weights of the retainers 13, 13' themselves.

As the aluminum alloy hardened material, the one used for the valve 9, first stem 15, second stem 14, etc. may be used. But since sliding occurs against the first return spring 2 and second return spring 1 during high-speed valve operation, an aluminum alloy is sometimes insufficient. In such a case, by using the above aluminum alloy powder containing 10 wt % of hard particles having an average diameter of about 1–5 $\mu$m, and a maximum diameter of about 15 $\mu$m, it is possible to suppress wear. As the hard particles, nitride ceramic, oxide ceramic, carbide ceramic are preferable. As examples, silicone nitride, alumina, and silicon carbide can be cited.

The second stem 14 is provided at a surface opposite the surface of the armature 3 provided with the first stem 15. On the second stem 14, a retainer 13' is provided. Between the retainer 13' and the housing 8, the second return spring 1 for imparting a biasing force in the direction in which the second stem 14 pushes the armature 3 is provided.

The second return spring 1 opposes the biasing force of the first return spring 2, which acts on the armature 3 to prevent the armature from being pressed toward the other electromagnet 6 by the biasing force of the first return spring 2.

As a material forming the first stem 15 or second stem 14, it may be an iron-base material, but it is possible to use silicon nitride or a ceramic material having as its major component SIALON, aluminum alloy hardened material, titanium alloy, etc.

As for a ceramics containing silicon nitride or SIALON, to ensure reliability against breakage, use of a sintered member containing 80 wt % or more of silicon nitride or SIALON and having a relative density of 95 wt % or over is preferable.

Further, the ceramic material includes a fiber-reinforced ceramics and a whisker-reinforced ceramics.

Also, because they are required to be a high-temperature sliding member having a heat-resistant strength under sliding conditions, they may be made of aluminum alloy hardened material that is used for the valve 9.

The first stem 15 and second stem 14 may be formed of the same material or different materials.

Further, on the surface and end faces of the first stem 15 and second stem 14, it is possible to provide a coating film such as a ceramic coating film, carbon-base coating film or a composite-material coating film. By providing such a coating film, it is possible to reduce the dynamic friction coefficient and seizure on the sliding surface when the first stem 15 and the second stem 14 are driven in the guide hole 22 of the stator 5 and thus reduce the energy loss due to sliding. By providing such coating films on the end faces of the first stem 15 and second stem 14, it is possible to reduce the friction coefficient produced when it contacts the armature 3 while rotating and to reduce the energy loss.

As the coating film, a ceramic coating film, a diamond-like carbon film (hereinafter abbreviated to "DLC film"), a diamond film, a carbon nitride film or a composite-material film of a nitride, carbide, carbonitride, oxy-nitride, oxy-carbide, carbo-oxy-nitride or sulfide of a metal in the IVa, Va, VIa groups of the periodic table or aluminum (Al), boron (B), silicon (Si) may be used. In the composite-material film, powder particles of a metallic compound as a fixed lubricant are dispersed in a polymer.

As the structure of the coating film, a coating film using one kind of material among the above materials, a mixed film using two or more kinds of them, and a laminated film comprising a coating film using one material and the mixed films. The provision of the coating film eliminates the need of forced supply of lubricating oil to the sliding surface where the first stem is driven through the guide hole 22 formed in the stator 5, thereby avoiding failure of the electromagnetic actuator.

The armature 3 may be, if necessary, joined to or mechanically fastened to one or both of the first stem 15 or second stem 14. By this arrangement, it is possible to guide the reciprocating movement of the armature 3 between the electromagnets 6 and 7.

As the first stem 15 or second stem 14 to be joined to or mechanically fastened to the armature, if a stem using a material smaller in specific weight than the armature 3 is selected, it is possible to achieve reduction in weight compared with the case in which an integral driving member is formed which consists of a stem and an armature made of the same material.

As a method of coupling the armature 3 and first stem 15 by joining or mechanical coupling, slidably coupling them together, bonding them together, or mechanically coupling them together can be cited. To ensure reliability of detaching and attaching, a joint means using a retainer in which a recessed groove is formed in the circumferential direction of the stem and the armature 3 is sandwiched there. Here, as a lighter material than the armature 3, ceramic material whose major component is silicon nitride or SIALON, an aluminum sintered material by powder molding, and a titanium alloy can be cited.

The material forming the first return spring 2 or the second return spring 1 may be an iron-base material. But by using the following material, namely, an alloy steel containing C: 0.55–0.70 wt %, Si: 1.0–2.2 wt %, Cr: 1 wt % or under, Mn: 1 wt % or under, V: 0.2 wt % or under, and if necessary, Mo and Nb, having a tensile strength of 1960 N/mm$^2$, the particle diameter of inclusions such as SiO$_2$ and Al$_2$O$_3$ being 25 μm or under, and having a tempered martensitic structure, it is possible to obtain desired spring characteristics and lessen the spring weight. In the case of such a high-strength steel, after melt casting and hot pressing, it is worked to an intended wire diameter by combining shaving, wire drawing and patenting, and then hardening and tempering to obtain a steel wire. Thereafter, coiling, strain-removing annealing, shot peening, and if necessary, nitriding, shot peening and strain-removing annealing are usually carried out.

Further, as the material of the first return spring 2 or second return spring 1, if a titanium alloy comprising a total of 13 wt % of Al and V, having a tensile strength of 1500 N/mm$^2$ and having a surface coating that is good in wear resistance is used, it is possible to obtain desired spring characteristics and lessen the spring weight. The high-strength titanium alloy is melted in a vacuum, melt-forged repeatedly until component segregation decreases sufficiently, hot-pressed, then solution treatment and wire drawing repeatedly. After it has been worked to an intended wire diameter, it is subjected to ageing treatment. The steps after coiling are basically the same as mentioned above.

Furthermore, as the material of the first return spring 2 or second return spring 1, if an aluminum alloy containing a total of 5 wt % or more of Cu, Mg and Zn, having long crystal particles having an aspect ratio of the crystal particle diameter of 3 or over, and a tensile strength of 600 N/mm$^2$ or over, it is possible to obtain desired spring characteristics and lessen the spring weight. The high-strength aluminum alloy is formed into a powder of an intended composition, the powder is solidified into an ingot, and subjected to either or both of forging and pressing, wire drawing and solution treatment repeatedly to an intended wire diameter, and finally, ageing treatment. The steps after coiling are basically the same as with high-strength steel but no nitriding is done.

In order to use the above-mentioned titanium alloy or aluminum alloy for the first or second return springs, a coating film may be formed on their surface to improve their wear resistance.

The valve-open-close mechanism can be used for either of an intake line and an exhaust line. At this time, if a heat-resistant steel alloy is used as the marginal portion 17 of the valve 9, it is preferable to use it for an intake line. If a silicon nitride or SIALON-base ceramic material is used as the marginal portion 17 of the valve 9, it is preferable to use it for an exhaust line.

It is not necessary to manufacture all of the first stem 15, second stem 14, housing 8, valve 9, first return spring 2, second return spring 1, retainers 13, 13' and fixing members 20 of the above-described metal or its alloy, which is smaller in specific weight than iron, an alloy or a ceramic or a fiber- or whisker-reinforced ceramic reinforced with an aggregate which is smaller in specific weight than iron. Even if at least one of them is formed of such a material, and the others are formed of an iron-base material, it is possible to achieve lessening of the weight of an electromagnetic actuator for an internal combustion engine or a valve-open-close mechanism for an internal combustion engine obtained.

EXAMPLE 1

The parts forming the valve-open-close mechanism shown in FIG. 1 were manufactured from the following materials to form the valve-open-close mechanism.
(Armature)

As the armature 3, an existing magnetic steel material was used. The below-described first stem was pressed and joined to the armature.
(Stator)

The stator 5 of a shape shown in FIG. 4 was manufactured from a powder compressed molded body. Iron powder used was pure iron powder. It was manufactured by steps of preparing a powder solidified by quenching by blowing high-pressure water against molten metal, drying, and adjusting powder particle diameter distribution by passing through a mesh of a predetermined size. These steps are the same as in manufacturing an ordinary starting raw material powder for sintered machine parts. Thereafter, in order to assure insulation between pure iron powders, an oxide film was formed by heat treatment.

Main impurities before the formation of an oxide film were about 0.1 wt % of oxygen, about 0.05 wt % of Si and Mn, and about 0.005 wt % of carbon, phosphorus and sulfur. The powder particle diameter is controlled in the quench-solidifying step and the particle diameter distribution adjustment step for smooth and uniform flow filling into a mold, and so that as high an apparent density as possible will be obtained. The particle diameter distribution thus obtained was 5-10 wt % of particles having a diameter of less than 200 $\mu$m and 150 $\mu$m or over, 40-50 wt % of particles of less than 150 $\mu$m and 75 $\mu$m or over, and 40-50 wt % of particles of less than 75 $\mu$m and 30 $\mu$m or over. According to the flow property evaluation under JSPM standard, which is an index of flow filling properties, for the powder having such a particle diameter distribution, the time taken for 50 grams of powder housed in a funnel container having an outlet diameter of 2.5 mm to pass the outlet was 20-30 seconds. Also, the apparent density under the standard was 2.9 to 3.5 g/cm$^3$.

In order to manufacture the stator by molding this powder, the powder was charged into a mold, and in order to prevent seizure between the mold and the iron powder in uniaxially compressing, 0.5 to 0.7 wt % of organic resin containing a thermosetting resin as its major component was blended.

The powder compressed molded body obtained by cold-compression-molding the powder was 7.0 g/cm$^3$ in density. For a powder compressed molded material obtained by warm compression molding, the density was 7.3 g/cm$^3$. In warm compression molding, the mold and the powder to be compressed were controlled to a temperature of 130° C. to 150° C. The reason why the density was high in this case was mainly because the yield stress of the iron powder decreased and the deformability increased due to softening, so that the consolidation property increased.

These molded members were calcined at 200° C. in the atmosphere to obtain stators. The density of the stator after calcining was 7.1 g/cm$^3$ for the one formed by cold compression molding, and 7.4 g/cm$^3$ for the one formed by warm compression molding.

Generally, in an alternating magnetic field, the higher the frequency, the more an eddy current is produced and the more loss of magnetic force occurs. But with an aggregate of such a powder, production of eddy current is suppressed in the powder units, so that it is possible to lower the loss. With this stator, due to its structural feature, there is little anisotropy in permeability. Dimensional variations after molding and calcining were small, so that no additional working was necessary. Thus, there was no need to set a bearing for passing the stem.

Comparative members were manufactured of a laminated silicon steel plate. For the laminated silicon steel plate, in view of the balance of punching workability and higher permeability than iron, a unidirectional silicon steel plate containing 3 wt % of silicon was used. Since anisotropism is produced that the permeability is large in the rolling direction and small in a normal direction, as shown in FIGS. 5A and 5B, a laminated structure was used. For the purpose of suppressing eddy current, on the surface of the steel plate, an electric insulating resin layer was formed and it was assembled by superposing steel plates. Plates punched into strips were laminated and assembled, and fixed together by welding their ends with a laser. As for the accuracy of this stator, since the accuracy of the steel plate itself and the accuracy at the time of laminating and assembling are multiplied, it was impossible to expect a high dimensional accuracy compared with a stator formed by powder compression. Thus, machining was necessary at the end face on the side where the housing and the armature contact with each other. Also, the dimensional accuracy of the hole for receiving the stem was also low, so that additional working and setting a bearing were necessary. The assembled laminated steel plate member had a density of 7.8 g/cm$^3$.

The maximum flux density at direct current of the stators thus formed by powder compression molding was 1.3 T for cold-molded members and 1.5 T for warm-molded members. In contrast, the maximum flux density at direct current when laminated silicon steel was used was 1.3 T.

If the compression stress during warm molding is reduced to increase productivity, the density of the stator obtained decreases from 7.1 to 6.9 and 6.7 g/cm$^3$. Together with it, the maximum flux density during direct current decreases from 1.3 to 1.15 and to 1.0 T, so that the magnetic properties become inferior. Thus, it is preferable that the density of the powder compression molded member is 7.0 g/cm$^3$ or over. Also, although no additional working is normally not needed, in order to confirm workability, when the stator was subjected to additional working, chipping occurred for ones having densities of 6.7 and 6.9. For the one having a density 7.1, although fine chipping occurred, it was at such a level that it can be sufficiently used. From a workability aspect, too, it is apparent that the density of the powder compression molded member is preferably 7.0 g/cm$^3$ or over.

From the above results, it has been confirmed that with a powder compression molded member, if its density is 7.0 g/cm$^3$ or over, the number of steps is small compared with a laminated silicon steel plate, and although it is compact, it is possible to achieve equivalent or better magnetic properties.
(Coil)

As the coil 18, a 6000-series material having a conductivy of 50% IACS specified in JIS H 4000 was used instead of a conventional copper-base material. As a coating material for the coil member, a polyimide resin was used.
(Stem)

As the first stem 15 and second stem 14, specimens made in the following manner were used. A powder in which 5 wt % of yttrium oxide and 2 wt % of aluminum oxide were wet-blended in ethanol into a commercial silicon nitride powder ($\alpha$-crystal phase ratio: 90% or over, average particle diameter: 0.8 $\mu$m) was dried. After a predetermined molding organic binder had been added, the mixture was molded. Sintering was carried out at 1800 degrees in a 4-atm nitrogen gas atmosphere for 10 hours, and it was worked into a predetermined shape with a diamond tool. For this sintered member and a sintered member manufactured simultaneously, the three-point bending strength was measured under JIS R 1601. The average strength was 1050 MPa.

(Housing)

The housing 8 was manufactured by the following method. A slurry was prepared by mixing 65 parts by weight of Ni powder containing 18% Fe having an average diameter of 2.5 μm and 8% Cr, 2 parts by weight of a dispersant, 11 parts by weight of water and 12 parts by weight of phenolic resin. The slurry was impregnated into a polyurethane foam which had a thickness of 8 mm and in which the cell number per inch was 29, and excess slurry that adhered was removed by use of a metallic roll, and the sheet was dried for 10 minutes at 120° C. By heat-treating this sheet at 1200° C. under vacuum for one hour, a porous metallic member having a density of 0.91 g/cm$^3$ was prepared. After the metallic porous member has been worked into a cylindrical shape, it was set in a mold. By injecting under pressure of 1.2 MPa molten metal aluminum alloy (Al containing 2 wt % Cu) heated to 760° C. a housing comprising a metallic porous member/aluminum alloy composite material was manufactured. As a comparative member, a housing was also formed from only an aluminum alloy without compositing the metallic porous member. The tensile strength measured for each of them was as follows: composite material: 231 MPa, aluminum alloy: 142 MPa.

(Return Coil Spring)

The return coil spring was manufactured by the following method. By repeatedly subjecting a steel comprising C:0.65 wt %, Si:1.98 wt %, Mn:0.78 wt %, Cr:0.75 wt %, V:0.11 wt %, the remainder being substantially Fe to melt-forging, rolling, shaving, wire drawing, and heat treatment to obtain a wire 3.0 mm thick. The particle diameter of non-metallic inclusion was 20 μm at maximum. From this wire, a high-strength coil spring was manufactured by combining coiling, strain-removing annealing, shot peening and nitriding.

(Retainers)

For the retainers 13, 13', because they retain the valve through a retaining part called cotter (retainer lock), and make a high-speed reciprocating motion integral with the valve 9, heat fatigue strength and shock strength are required. Also, with the rotation of the valve 9, they slide against the first return spring 2 and the second return spring 1, so that wear resistance is also required. To assure heat fatigue strength and shock strength, for an aluminum alloy, an alloy design for forming submicron fine crystal particles and a rapidly solidifying process are required. As such an aluminum alloy, using Al-17 wt %, Si-1.52 wt %, Zr-1.5 wt %, Ni-2 wt %, Fe-5 wt %, Mm, an aluminum powder having an average particle diameter of 50 μm was manufactured by gas cooling solidifying process and it was used as a starting material. Also, in view of the requirement of wear resistance, because it is difficult to deal only with an aluminum alloy, as hard particles, 9 wt % of alumina particles having an average particle diameter of 2 μm and a maximum particle diameter of 12 μm were added.

After uniaxial powder compression molding, it was heated at 500° C. and densification and imparting final-shape were carried out simultaneously by hot forging. Thereafter, in order to remove burrs and layers at the surface-layer portion where powder bonding was weak, barrel treatment was carried out. No machining was carried out. The density was 3.2 g/cm$^3$.

For conventional retainers, steels for machine structural use such as JIS S17C or if circumstances require, alloy steels such as JIS SCr415 are often used. The retainer as a comparative member was manufactured using the latter. After shape imparting to the latter alloy steel by hot forging, it was roughly machined, carburized and annealed and then finish working was done. The density was 7.8 g/cm$^3$.

(Bolts)

As the bolts used for mounting the housing 8 to the internal combustion engine body 19, a 4000-series material stipulated under JIS H 4000 was used against a conventional steel material.

(Valve)

As the valve 9, 5 wt % of yttrium oxide and 2 wt % of aluminum oxide were wet-blended into a commercial silicon nitride powder (α-crystal phase ratio: 90% or over, average particle diameter: 0.8 μm) in ethanol. The powder obtained was dried. After a predetermined organic molding binder had been added, predetermined molding was carried out. Thereafter sintering was carried out at 1800 degrees in a 4-atm-pressure nitrogen gas atmosphere for 10 hours, and it was worked into a specimen of predetermined shape by a diamond tool. For this sintered member and a sintered member manufactured simultaneously, when the three-point bending strengths were measured under JIS R 1601, the average strength was 1050 MPa.

(Manufacturing Valve-Open-Close Mechanism)

Using the abovesaid parts, electromagnetic actuators and valve-open-close mechanisms were manufactured.

EXAMPLE 2

Except that the following stem was used, electromagnetic actuators and valve-open-close mechanisms were manufactured in the same manner as in Example 1.

(Stem)

On the surface of the stem manufactured in Example 1, a DLC film was formed in the following method which is a known capacitive coupling type plasma CVD method. A stem base member washed with a solvent or a detergent and dried was mounted to an electrode connected to a high-frequency power source (frequency: 13.56 MHz). After exhausting at a degree of vacuum of 1×10$^{-4}$ Pa, argon gas was introduced until it was maintained at a pressure of 1×10$^{-1}$ Pa. In this state, a high frequency output of 400 W was supplied to the electrode from the high-frequency power source, and maintained for 15 minutes so that the electrode carrying the stem would be covered by plasma. After a natural oxide film on the surface of the base member had been removed by ion cleaning, the supply of argon gas was stopped and methane gas was introduced until it was maintained at a pressure of 1×10$^{-1}$ Pa, and a high frequency output of 600 W was supplied to the electrode from the high-frequency power source to form a DLC film. The film thickness was about 1 μm.

COMPARATIVE EXAMPLE 1

Using the abovesaid comparative members for the stator, housing and retainer, and parts formed of an iron-family material for the other parts, an electromagnetic actuator and a valve-open-close mechanism were manufactured.

[Results]

The weights for Examples 1 and 2 and Comparative Example 1 were measured. For Examples 1 and 2, compared with Comparative Example 1, as the total weight, 70 wt % of weight reduction was achieved.

Also, performance tests were conducted for the valve-open-close mechanisms of Examples 1 and 2 using a 12 V direct current constant-voltage power source. Power consumption at that time was measured. As a result, in Example 2, the consumed power reduced by 20% compared with Example 1. Thus, it was found out that by the formation of the DLC film on the surface of the stem, it was possible to further reduce the sliding resistance between the stator and the stem.

According to this invention, because a metal powder molded body is used for the stator, it is possible to improve the electromagnetic properties of the stator and make the electromagnetic actuator compact.

Also reduction in the volume of the electromagnet leads to reduction in volume and weight of the parts including the housing.

The provision of a stopper in the form of an iron plate on the surface of the stator prevents wear or breakage of the stator due to hard contact against the armature during operation of the electromagnetic actuator.

Further, by providing a ceramic covering film or carbon-base covering film on the surface of the stem, it is possible to reduce the power consumption.

What is claimed is:

1. An electromagnetic actuator for an automotive internal combustion engine having a valve, said electromagnetic actuator comprising a pair of electromagnets each made up of a stator and a coil, an armature disposed between said pair of electromagnets so as to be reciprocable therebetween, and a first stem provided on one side of said armature to the valve of said automotive internal combustion engine, said stators being formed by powder molding and having a density of 7.0 to 9.0 g/cm$^3$.

2. The electromagnetic actuator as claimed in claim 1 wherein said stator is formed by powder-molding an iron-family powder having iron oxide film or a coating resin film, part or all of said iron oxide film or said coating film remaining.

3. The electromagnetic actuator as claimed in any of claim 1 wherein said powder molding method is one of a cold mold press molding, warm mold press molding and injection molding.

4. The electromagnetic actuator as claim 1 wherein said armature reciprocates so as not to directly contact with said stator.

5. The electromagnetic actuator as claimed in claim 4 wherein an iron plate is provided in close contact with the surface of said stator, said stator abutting said armature through said iron plate.

* * * * *